United States Patent [19]
Lopez et al.

[11] 3,799,677
[45] Mar. 26, 1974

[54] PHOTOMETRIC HEAD FOR MEASURING THE DIAMETERS OF HARDNESS INDENTATIONS

[75] Inventors: Fernand Louis Lopez, Maurepas; Béla Scheffer, Domont; Huguette Nelly Vulmière; Jacques Claude Vulmière, both of Paris, all of France

[73] Assignees: Establissement Public: Agence Nationale de Valorisation de la Recherche Anvar, Neuilly S/Seine; Regie dite: Regie Nationale des Usines Renault, Boulogne Billancourt; Societe Anonyme: Automobiles Peugeot, Paris, all of, France

[22] Filed: Sept. 22, 1972

[21] Appl. No.: 291,322

[30] Foreign Application Priority Data
Oct. 7, 1971    France .............................. 71.36121

[52] U.S. Cl. ........... 356/156, 250/219 WD, 356/171
[51] Int. Cl. ............................................. G01b 11/00
[58] Field of Search ........... 356/156, 171, 172, 199; 250/219 WD

[56] References Cited
UNITED STATES PATENTS
3,365,699   1/1968   Foster .................. 250/219 WD X
3,620,629   11/1971  Whittington ................... 356/156 X
3,248,845   5/1966   Schneidier ..................... 356/156 X Primary Examiner—Ronald L. Wibert
Assistant Examiner—Paul K. Godwin
Attorney, Agent, or Firm—Baldwin, Wight & Brown

[57] ABSTRACT

A photometric head for automatic measurement of the diameter of Brinnel hardness indentations.

The photometric head comprises an optically opaque screen interrupted by at least two similar windows therethrough, one said window being at a distance to one side of said centre substantially equal to the tolerated minimum indentation image radius and another said window being at a distance to the other side of said centre substantially equal to the tolerated maximum indentation image radius; photoelectric means associated with each window and adapted to generate electrical signals which vary according to the luminous flux passing through each respective window; means for detecting the levels of said electrical signals; means coupled to said detection means and responsive to said levels for indicating the compliance of the metal sample with respect to the tolerated minimum and maximum indentation radius.

10 Claims, 12 Drawing Figures

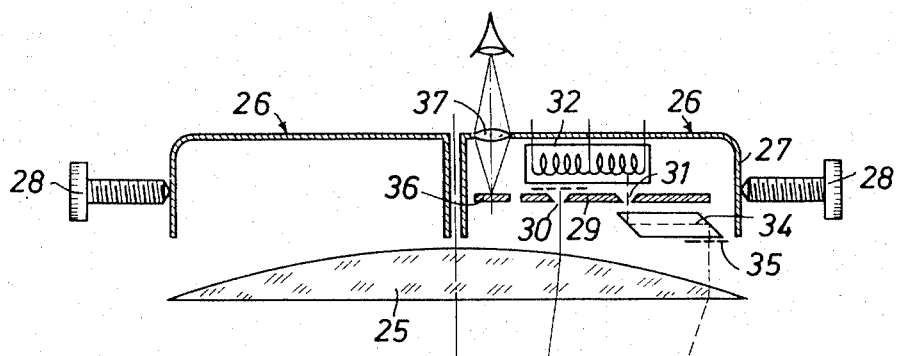
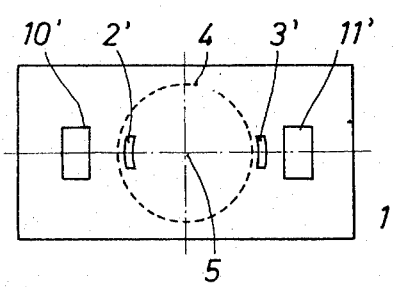
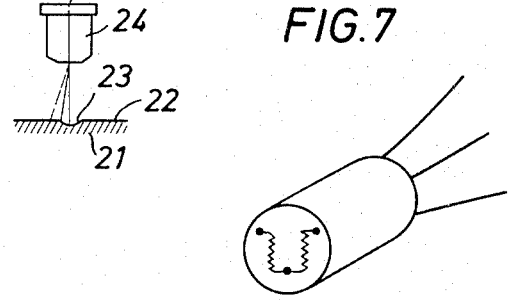

PHOTOMETRIC HEAD FOR MEASURING THE DIAMETERS OF HARDNESS INDENTATIONS

The present invention relates to a photometric head for automatic measurement of the diameter of Brinell hardness indentations, and also to the various applications of this head, particularly the measurements of Brinell hardness on hardness testing machines of the episcopic projection type, More particularly, the invention relates to the automatic sorting of indentations obtained by ball testing on metal parts.

Ball testing is commonly used to determine the hardness of a metal sample by gauging or measuring the diameter of the indentation left by a ball in contact with the surface of the sample when a determined load is applied to the ball.

The invention relates more particularly to the gauging of the diameter of these indentations in order to classify them in the usual manner into three categories, namely: too heavy an indentation corresponding to a metal of insufficient hardness; correct indentation corresponding to a metal of suitable hardness; and too small an indentation corresponding to a metal of excessive hardness.

The device according to the invention is applied more particularly to ball testing machines of the type in which after the ball test the metal piece under test remains fixed on the support plate and the ball support is replaced by a microscope objective support, the objective projecting an image of the indentation on a ground glass screen; the image has the appearance of a dark disc having a bright centre and standing out against the bright background of the image of the polished surface of the piece being tested.

In machines of this kind the different indentation diameters are all centered on the same point and they are gauged visually by means of a tolerance screen which is placed in position in the plane of the ground glass screen and which makes it possible to eliminate rapidly all samples in which the edge of the indentation is situated outside the zone of the screen bounded by two parallel lines corresponding to the tolerated maximum and minimum radii.

The aim of the invention is to enable gauging in this way to be effected automatically without human intervention.

To this end, the invention relates to a photometric head for automatically measuring the diameter of Brinell hardness indentations which are obtained by the ball testing of a metal piece and the image of which is projected onto a screen after the ball test, in such a manner that the different diameters of indentation images will have the same fixed centre, characterised in that the said screen is opaque to light rays and is pierced by at least two identical windows aligned in a diametrical axis of the indentation images, one on each side of the said fixed centre. one of the said windows being situated, in relation to this centre, at a distance substantially equal to the tolerated minimum radius, while the other is situated, in relation to this centre, at a distance substantially equal to the tolerated maximum radius; photoelectric means associated with each window and adapted to supply an electric signal varying with the luminous flux passing through the respective windows; means for detecting the level of the said electric signals and means, connected to the said detection means, for signalling and/or controlling servocontrol elements intended to identify or isolate automatically any piece which does not come within the tolerances.

In a first embodiment the opaque screen has two identical windows, with each of which is associated a photo-electric cell, the two cells being connected to a logic circuit adapted to supply one of three different signals representing firstly the state of simultaneous excitation of the two cells, secondly the state of simultaneous non-excitation of the two cells, and lastly a state of dissimilar excitation of the cells, this circuit being in turn connected to the aforesaid signalling and control means.

In an arrangement of this kind all the indentations whose diameter is larger than the maximum tolerance cause the two windows to select two light beams coming from the same dark surface.

The logic detection circuit then supplies a first signal representing the simultaneous non-excitation of the two photoelectric cells.

In the event of the indentation having a diameter smaller than the minimum tolerance, the two windows select two beams coming from the same bright surface.

The logic circuit supplies a second signal representing the state of simultaneous excitation of the two photoelectric cells.

Finally, if the diameter of the indentation is within the two limit tolerances, one of the windows will necessarily select a beam coming from a bright surface and the other a beam coming from a dark surface.

The detection logic circuit then supplies a third signal representing different states of excitation of the two photoelectric cells.

It is thus possible to select automatically the pieces complying with the tolerances and those not complying, and among the latter it is possible to distinguish between those which are made of a metal of insufficient hardness and those of a metal of excessive hardness.

In a more elaborate embodiment, the device comprises an opaque screen identical to the one just described and provided with two additional identical windows in alignment with the first two windows and disposed symmetrically in relation to the aforesaid common centre of the identation images, at a distance from the said centre which is greater than the tolerated maximum radius and such that in all cases the said windows select a beam coming from a bright surface situated outside the indentation; a photoelectric cell associated with each of the four windows, the circuits of the two cells associated with each pair of windows situated on the same side in relation to the said common centre constituting two of the branches of a Wheatstone bridge, while the said detection means are constituted by a detection logic circuit connected to the measuring diagonals of the two Wheatstone bridges and adapted to supply one of three different signals which represent, firstly, a state of simultaneous equilibrium of the two bridges, secondly a state of simultaneous disequilibrium of the bridges, and lastly a state of dissimilar equilibrium of the bridges, this circuit being in turn connected to the aforesaid signal and/or control means.

It will be understood that in this arrangement the two Wheatstone bridges will both be balanced (indentation diameter smaller than the minimum tolerance) or will both be unbalanced (indentation diameter larger than the maximum tolerance) when the pieces do not comply with the required tolerances. The detection signal supplies a first or a second signal representing in the one case the state of simultaneous equilibrium of the two bridges, and in the other case the state of simultaneous disequilibrium of the bridges.

On the other hand, if the indentation diameter is within the tolerance range, one of the Wheatstone bridges is unbalanced and the other is not. The detection circuit then supplies a third signal representing this state of disequilibrium. With the aid of these three different signals it is easy to arrange for the defective pieces to be indicated and optionally to be isolated by a suitable automatically controlled arrangement.

Other characteristics and advantages will be seen from the description which follows of forms of construction of the device according to the invention, this description being given solely by way of example and with reference to the accompanying drawings, in which:

FIG. 1 illustrates diagrammatically a first form of construction of an opaque screen of a device according to the invention;

FIGS. 1b and 1c illustrate diagrammatically the photoelectric means associated respectively with the left-hand window and with the right-hand window of the screen shown in FIG. 1a;

FIG. 3 illustrates a preferred form of construction of the screen of the device shown in FIG. 2;

FIG. 4 illustrates in diagrammatical section a photoelectric detection head designed in accordance with the principle illustrated in FIG. 2;

FIG. 7 shows a particularly advantageous type of photoelectric cell.

Figure 1A:
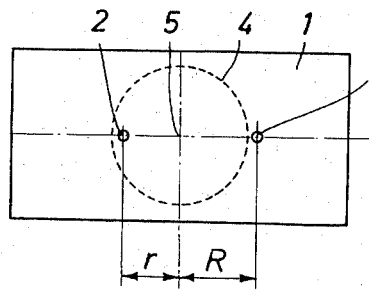

As stated above, the present invention is applied to machines which permit the successive ball testing of a piece and measurement of the diameter of the indentation obtained without displacing the sample fixed on the plate, above which is situated a microscope projecting on a ground glass screen the image of the surface to be ball tested.

A retractable automatic system permits the ball testing and the centre of the indentation is always projected at the same point on the ground glass screen.

In this type of machine the surface of the sample is polished and diffusing, and appears bright on the projection screen.

On the other hand, after the application of the ball, the spherical indentation becomes reflecting. Its marginal zone returns the illumination beams outside the pupil of the microscope, and consequently appears dark on a bright background. This enables the diameter of the indentation to be measured.

The device according to the invention is based on the principle consisting in utilising the contrast existing between the dark and bright zones separating the edge of the indentation image for the purpose of making a photometrical measurement by the on/off method with the aid of a differential photometric arrangement.

The device of the invention thus comprises a photometric head and its associated electronic circuits, this head being intended to replace the conventional visual control heads with which machines of the type defined above are equipped.

In a photometric head according to the invention the conventional tolerance screen, which was transparent and engraved with lines, is replaced by a screen 1 (FIG. 1a) which is opaque to light rays. In this screen are pierced two small identical windows 2 and 3, which are preferably circular and are aligned along a diametrical axis of the indentation images symbolically represented at 4, the windows being disposed one on each side of the common centre 5 of these images.

One of these windows (2) is situated at a distance from the centre equal to the tolerated minimum radius r, and the other window (3) is situated at a distance from the centre 5 equal to the tolerated maximum radius R, the permissible radius of the indentation lying between r and R. Facing each of the circular windows 2 and 3 is disposed a photoelectric cell 6 and 7 respectively the output circuit of each of these cells being connected to a galvanometer (8 and 9).

Figure 1B:
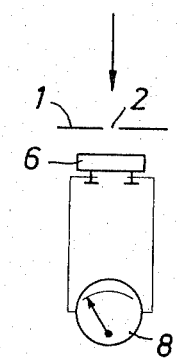
Figure 1C:
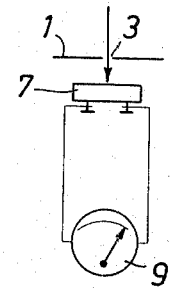

FIGS. 1a, 1b, and 1c simply illustrate the principle on which the device according to the invention is based.

It will easily be understood that when the diameter of the indentation 4 is situated within the range of tolerance, that is to say when it is smaller than the maximum diameter and larger than the minimum diameter, only one of the two circular windows, in this particular case the window 2, is capable of receiving a beam coming from a dark zone, that is to say coming from a part of the surface of the indentation. On the other hand, the other window (3) receives a beam which is more intense because it comes from the uniformly polished surface outside the indentation.

This situation has been indicated by an obstructed arrow in FIG. 1b, and by an arrow reaching the cell 7 in FIG. 1c.

The photoelectric cell 6 is therefore not excited and the galvanometer 8 indicates no passage of current, whereas the cell 7 is excited and the galvanometer 9 detects the passage of an electric current.

On the other hand, in the case of indentations the diameter 4 of which could be smaller than the tolerated minimum diameter, the two windows 2 and 3 receive beams coming from the uniformly polished surface of the sample and consequently the two cells 6 and 7 are excited and the galvanometers 8 and 9 both indicate the passage of an electric current.

Finally, in the case where the diameter of the indentation 4 is greater than the tolerated maximum diameter the two windows 2 and 3 receive beams coming from a dark zone of the indentation, so that neither of the cells 6 and 7 is excited and the two galvanometers 8 and 9 do not direct the passage of any electric current.

It is consequently seen that the piece under test is acceptable only in the event of the two galvanometers 8 and 9 giving asymmetrical indications, that is to say when only one of them detects the passage of a current.

In other cases, that is to say when the galvanometers are both excited or both not excited, the piece under test is to be rejected because the diameter of the indentation is outside the range of tolerance.

On the basis of this principle it is naturally possible to conceive a device containing only the detection elements shown diagrammatically in FIGS. 1a, 1b and 1c, and in which the galvanometers 8 and 9 could be replaced, for example, by coloured pilot lamps, in which case human intervention would be necessary to effect the comparison between the two visual signals supplied by the detection means, in order to control the changeover to the testing of the next piece and, where applicable, the rejection of the defective piece.

It is nevertheless preferable to automate the device entirely by providing a detection logic circuit connected to the output terminals of the two cells 6 and 7 and in turn connected to a signal device and/or to automatic control means controlling the isolation, marking, or rejection of the defective piece.

A logic circuit of this kind is in fact capable of supplying one of three different signals representing firstly a state of simultaneous excitation of the two cells, secondly a state of simultaneous non-excitation of the two cells, and finally a state of dissimilar excitation of the cells, this circuit being in turn connected to the aforesaid signal and/or control means.

The reliability of a system of this kind depends on the constancy of the reflection factor of the indentation surface. In order to eliminate the influence of variations of this reflection factor, it is preferable to employ the form of construction of the device the principle of which is illustrated diagrammatically in FIG. 2.

Figure 2:
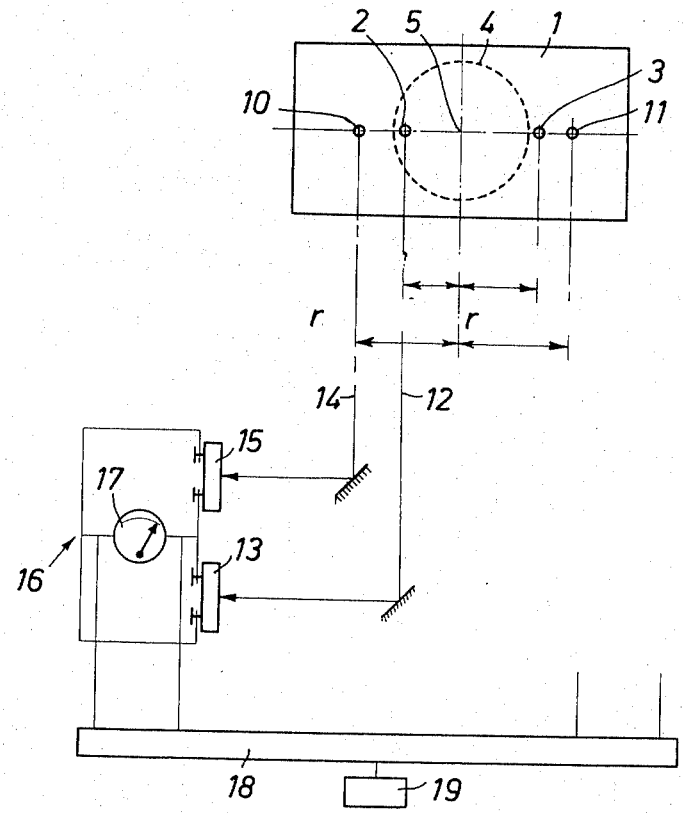
FIG. 2 illustrates diagrammatically part of a second form of construction of the device according to the invention.

In FIG. 2 there is shown a screen 1 identical with the screen 1 of FIG. 1a and having the same two identical circular windows 2 and 3, disposed in the same manner. In addition, there are added two other identical circular windows 10 and 11 respectively, disposed one on each side of the windows 2 and 3.

These windows 10 and 11 are in alignment with the windows 2 and 3 and are situated at equal distances from the common centre 5, The distance between each of the windows 10 and 11 and the centre 5 is slightly greater than the tolerated maximum radius and is such that, whatever the indentation diameter 4, the windows 10 and 11 are adapted to receive in all cases a beam coming from a uniformly polished surface of the piece examined.

Associated with the pair of windows 2 and 10 is a photoelectric circuit identical to that associated with the other pair of windows 3 and 11, so that only one of the photoelectric circuits is illustrated and will be described.

The light beam selected by the window 2 and indicated symbolically by the line 12 is passed to a first electric cell 13. The light beam selected by the window 10 and indicated symbolically by the line 14 is passed to a second photoelectric cell 15. The two photoelectric cells 13 and 15 constitute two of the branches of a Wheatstone bridge 16 in whose measuring diagonal a galvanometer 17 is connected. This Wheatstone bridge is shown only very diagrammatically in FIG. 2.

Simple examination of FIG. 2 will make it easily understood that when the indentation diameter 4 is situated within the range of tolerance, only the window 2 of the pair of windows 2 and 10 receives a beam coming from a dark zone of the indentation, so that the Wheatstone bridge 16 is unbalanced.

On the other hand, neither of the pair of windows 3 and 11 receives a beam coming from a dark zone of the indentation, and consequently the Wheatstone bridge associated with these windows detects no disequilibrium.

On the other hand, in the case where the indentation diameter 4 is smaller than the tolerated minimum diameter, none of the four windows 2,3,10,11 receives a light beam coming from a dark zone of the indentation, so that in this case neither of the two Wheatstone bridges associated with the two pairs of windows is unbalanced.

Finally, in the event of the indentation diameter 4 being larger than the tolerated maximum diameter, the windows 2 and 3 would both receive beams coming from a dark zone of the indentation, while the other windows 10 and 11 would still receive beams coming from the uniformly polished zone of the sample. In this case the two Wheatstone bridges would be unbalanced.

It will be seen that the same type of detection is used as previously, that is to say pieces not in conformity are detected when the two Wheatstone bridges are simultaneously unbalanced (insufficient hardness) or/not unbalanced (excessive hardness). On the other hand, when only one of the two Wheatstone bridges is unbalanced, this indicates that the indentation diameter of the piece examined is within the tolerance range.

It is naturally preferable for the control process to be completely automated in the same manner as previously by providing a detection logic circuit connected to the two measuring diagonals of the two Wheatstone bridges, which circuit is adapted to supply one of three different signals representing firstly a state of simultaneous equilibrium of the two bridges, secondly a state of simultaneous disequilibrium of the bridges, this circuit being in turn connected to a signal device and optionally to an automatic control unit adapted to isolate, mark, and/or reject any piece found to be defective.

In FIG. 2 a detection logic circuit of this kind is designated 18, this circuit being connected through a signal and/or control unit 19 for suitable automatic control means.

The two Wheatstone bridges are balanced before the uniformly polished surface of a sample is subjected to the ball test. In view of the short distance separating the two windows of each pair, it is preferable to use a double photoelectric cell which is specially designed for differential connections and in which the elements of small dimensions are disposed side by side (FIG. 7), and to provide for beam transport from one of the two windows.

Furthermore, in order to have greater luminosity, the windows 2, 3, 10 and 11 may be shaped as shown in FIG. 3.

In FIG. 3, the two windows 2' and 3', known as measuring windows, are curved, the radius of curvature corresponding to a mean value of the radius of the indentation, and are relatively narrow. On the other hand, the two end windows 10' and 11', known as control windows, advantageously have a rectangular shape and are of dimensions substantially identical to those of the measuring windows 2' and 3'.

This special conformation of the measuring windows 2' and 3' also permits integration of a greater length of the edge of the indentation 4.

FIG. 4 illustrates diagrammatically a form of construction of a device according to the invention, based on the principle illustrated by FIGS. 2 and 3.

In this FIG. 4 there is diagrammatically shown at 21 a piece to be checked, with its uniformly polished surface 22 and its ball test indentation 23. A microscope objective 24 is disposed in the usual manner in the vertical axis of the ball test indentation 23.

In the optical axis of this objective 24 is mounted a field lens 25, above which is placed the photoelectric detection head according to the invention.

Figure 5:
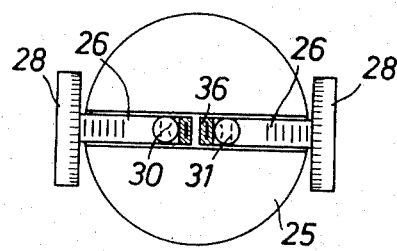
FIG. 5 is a partial diagrammatical top view of the head shown in FIG. 4.

This head is composed of two identical carriages adapted to slide along a diametrical axis of the field lens 25 (see also FIG. 5). These two carriages 26 are each composed of a sliding support 27, the radial diaplacement of which can be determined by means of a graduated drum, for example as diagrammatically indicated at 28; on the support 27 is fixed a screen 29 provided with a measuring window 30 and a control window 31 corresponding respectively to the windows 3' and 11' on the screen shown in FIG. 3. Above the screen 29, facing the windows 30 and 31, is mounted a double photoelectric cell 32.

In addition, between the screen 29 and the field lens 25 is interposed a translator prism 34 one end of which is disposed facing the control window 31, a ground glass surface 35 being provided on the inlet face of this prism.

Finally, in order to permit visual measurements, each carriage also carries a small ground glass screen 36 carrying an engraved line perpendicular to the measurement diameter, a viewing magnifying glass 37 and a graduated rule (not shown) being fixed facing the screen 36.

The two carriages 26 are mounted symmetrically and are displaced symmetrically in relation to the centre of the lens 25 by means of screws provided with graduated drums 28. In the case of the device shown in FIG. 4, the righthand carriage is intended for checking the maximum diameter, while the left-hand carriage is intended for checking the minimum diameter. The cells 32 are obviously each connected to a Wheatstone bridge (not shown in FIG. 4) in the manner illustrated in FIG. 2.

Figure 6A:
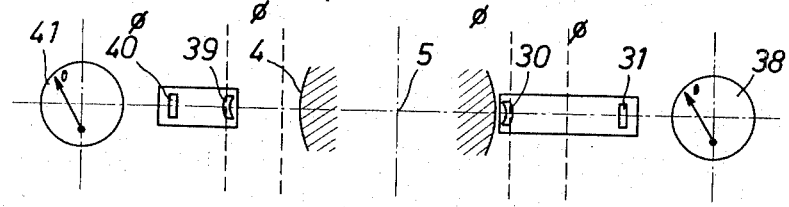
FIG. 6a, 6b and 6c illustrates respectively the different responses supplied by the device shown in FIG. 4 depending on whether the indentation diameter is smaller than the minimum, between the minimum and the maximum, or greater than the maximum respectively.
Figure 6B:
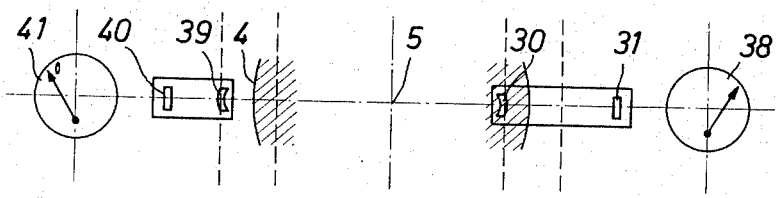
Figure 6C:
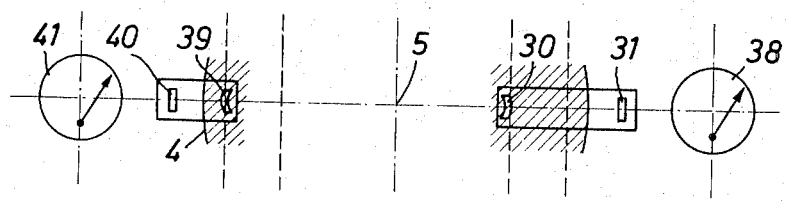

FIGS. 6a, 6b and 6c illustrate respectively the three cases which may arise in the examination of a piece after calibration of the two Wheatstone bridges and adjustment of the zero point of the photometric detection head. In these Figures 6a, 6b and 6c there are shown diagrammatically on the right-hand side the pair of windows comprising the measuring window 30 and control window 31, which are carried for example by the right-hand carriage 26 of the device shown in FIG. 4, and also the galvanometer 38 of the Wheatstone bridge associated with the windows 30 and 31. On the left-hand side of these Figures are shown the measuring window 39 and control window 40 associated with the left-hand carriage 26, and also the galvanometer 41 associated with these windows. Moreover, in these Figures the centre 5 corresponds to the centre of the indentations 4 and to that of the lens 25.

As stated above in connection with FIg. 2, examination of this Figure immediately shows that when the indentation diameter 4 is smaller than the tolerated minimum diameter, the two pairs of windows 30, 31 and 39 40 select light beams of the same intensity, so that neither of the two galvanometers 38 and 41 detects any electric current.

When the indentation diameter 4 is within the tolerance range (FIG. 6c), the window associated with the measurement of the minimum diameter selects a beam coming from a dark zone of the indentation, while the other window 31 still selects a beam coming from a bright zone of the sample, so that the galvanometer 38 detects the passage of an electric current. On the other hand in the case of the left-hand carriage, the two windows 39 and 40 select two beams of the same intensity and the associated galvanometer does not detect the passage of an electric current. Equilibrium between the two galvanometers 38 and 41 is thus observed.

Finally, in the case where the indentation diameter 4 is larger than the tolerated maximum diameter (FIG. 6c), the two galvanometers 38 and 41 both simultaneously detect the passage of an electric current.

Consequently, disequilibrium exists between the indications of the two galvanometers 38 and 41 only when the piece has an indentation the diameter of which is within the tolerance range.

In the device illustrated diagrammatically in FIG. 4, it is not necessarily a galvanometer that is connected in the measuring diagonal of the Wheatstone bridge, but a coloured pilot light may be so connected, thereby facilitating visual comparison of the detection supplied by the two Wheatstone bridges.

Obviously, as already stated in the case of the devices illustrated in FIGS. 1, 1b, 1c, on the one hand, and in FIG. 2 on the other hand, there is every advantage in supplementing the device shown in FIG. 4 in order to have an automatic line-up for checking the indentation diameter, by providing in the example illustrated (FIG. 2) a detection logic circuit connected to the two Wheatstone bridges and adapted to supply one of three different signals, representing firstly a stage of simultaneous equilibrium of the two bridges, secondly a state of simultaneous dis-equilibrium of the bridges, and finally a state of dissimilar equilibrium of the bridges, This circuit may, for example, activate a signal device and optionally an automatic control unit for automatically isolating, marking and/or rejecting any piece found to be defective.

In the device shown in FIG. 4 the role of the field lens 25 is to eliminate any defect in parallax in the position of the windows themselves, by forming the image of the pupil of the objective 24 at infinity, this lens being corrected for distortion for the plane of the windows.

The role of the small translator prism 24 is to maintain a minimum distance between the measuring window 30 and the control window 31, and to direct the light diffused by its inlet face to the working element of the double cell 32.

In addition, the control window 31 is advantageously provided (FIG. 4) with a ground glass screen permitting integration of a large polished surface, this screen being constituted by the ground glass surfaces 5 provided on the inlet face of the prism 34.

Furthermore, it is advantageous for the measuring and control windows to be adjustable in width and height in order to adapt them to the highest possible precision, which is determined essentially by the quality of the polishing.

Figure 5A:
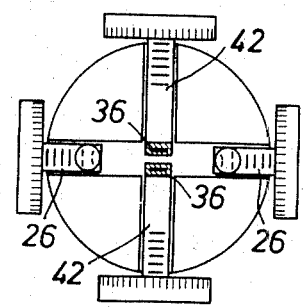
FIG. 5a shows an alternative form of construction of the device shown in FIG. 5.

In an alternative, the visual measurement means constituted by the engraved screen 36 and the magnifying glass 37 can be separated from the two carriages 26 by mounting them, for example, on two symmetrical carriages 42, which are similar to the carriages 26 and move along a second diametrical axis of the lens 25 which is perpendicular to the first diametrical axis along which the carriages 26 move (FIg. 5a).

For an indentation of given diameter, it has been accepted that the centre was clearly defined on the ball testing axis of the machine. There must consequently be available a reading system the origin of which is situated on this axis and which enables an identical value to be read on each carriage, this value being equal to twice the radius measured, since the display is in diameters, Double adjustment is therefore necessary.

A metal piece on which a standard circle of known value is engraved is placed on the plate of the machine, the carriages are placed in position, and then the reference rules of the visual measurement means (not shown) and the graduated or other drums are also positioned so as to obtain on the right and on the left, both visually and photometrically, indentical values equal to those of the diameter of this circle.

A well machined piece is then subjected to the ball test and the whole arrangement is moved so that the windows and/or engraved lines are equidistant from the centre of the impression, that is to say that readings are identical on both edges of this indentation.

As has been stated above, the bridge will be adjusted, before any indentation is made, by equalising the fluxes falling on the two elements of each double cell, by means of the right-hand or control window, which for this purpose is made adjustable. In this case, the balancing of this differential arrangement will be stable, because it is scarcely affected by variations of intensity of the lamps or of the polishing reflection factor.

On the other hand when the image of the edge of the indentation is formed on one of the measuring windows, the disequilibrium of the corresponding bridge varies in dependence on the luminance of the part of the polished surface the image of which is formed on the control windows.

There will then be determined the value of the useful flux for obtaining optimum operation of the detection circuits disposed upstream and serving to control the signalling and/or the automatic control units mentioned previously.

This flux value will then be kept constant whatever piece is to be tested, by modifying accordingly the voltage of the light source. This automatic control may be effected in any suitable manner and may consist in taking from this cell circuit, corresponding to the form of verification, the information necessary for this variation of voltage, this being done during the period of time necessary for bringing the piece into contact with the stop of the machine.

The accuracy of the verification effected with the aid of a device according to the invention, and based on the principle illustrated by FIG. 2, is of the same order as that of visual verification, but the rate can be far higher in the case of complete automation.

The invention is obviously not restricted to the embodiments illustrated and described above, but on the contrary embraces all alternatives, particularly those relating to the dimensions and shape of the different slits or windows, and also the nature and structure of the means of detecting the simultaneous excitation or non-excitation of the photoelectric cells for the purpose of obtaining signalling of any kind or the control of one or more auxiliary automatic control units.

We claim:

1. A photometric head for automatic measurement of the indentation diameter obtained on a metal sample by Brinell hardness ball testing and optically projected with reference to a fixed centre, which head comprises:

a. an optically opaque screen located to intercept a projected image of said indentation, said screen being interrupted by at least two similar windows therethrough, one said window being at a distance to one side of said centre substantially equal to the tolerated minimum indentation image radius and another said window being at a distance to the other side of said centre substantially equal to the tolerated maximum indentation image radius, said screen having two further identical windows aligned with the first said two windows and disposed symmetrically with respect to said fixed centre at a common distance therefrom substantially greater than the tolerated maximum indentation image radius whereby said further windows transmit in all cases light from the metal sample surface situated outside the indentation;

b. photoelectric means associated with each window and adapted to generate electrical signals which vary according to the luminous flux passing through each respective window, said photoelectric means comprising a photoelectric cell associated with each of the four windows, the circuits of the two cells associated with each pair of windows on the same side of said fixed centre forming two of the arms of a Wheatstone bridge;

c. detection means for detecting the levels of said electrical signals, said detection means includes a logic circuit connected to the diagonal measuring arms of the two Wheatstone bridges and adapted to supply one of three different signals representing respectively a state of simultaneous equilibrium of the two bridges, a state of simultaneous disequilibrium of the two bridges and a state of dissimilar equilibrium of the two bridges;

d. means coupled to said detection means for responding to said levels in accord with compliance of the metal sample with respect to the tolerated minimum and maximum indentation radius.

2. A measuring head according to claim 1 wherein the first said two windows are relatively narrow and curved with a radius of curvature corresponding to the average indentation radius.

3. A measuring head according to claim 2 wherein said two further windows are rectangular and have an area substantially equal to that of the first said windows.

4. A measuring head according to claim 2 wherein the dimensions of the windows are adjustable.

5. A measuring head according to claim 1 wherein the opaque screen having two pairs of windows is divided into two parts which are symmetrical in relation to the said fixed centre, each half-screen being mounted with the two photoelectric cells associated with their respective windows on a carriage for sliding along a diametrical axis of the indentation images, graduated means being provided for moving the carriage at will.

6. A measuring head according to claim 5, characterised in that each carriage also carries means for visual measurement of the indentation diameter.

7. A measuring head according to claim 5, intended for mounting on a ball testing machine enabling ball testing to be effected and then permitting observation of the indentation images by means of a microscope objective, wherein a collimator field lens corrected for distortion is interposed between the said objective and the two screen carrier carriages.

8. A measuring head according to claim 7, wherein a translator prism is mounted before the window situated the greatest distance from the centre of the indentation images, between the screen and the field lens.

9. A measuring head according to claim 8 wherein the inlet face of the translator prism is ground.

10. In a hardness testing machine of the episcopic projection type, the improvement whereby said machine has a measuring head according to claim 1.

* * * * *